(12) United States Patent
Hackl

(10) Patent No.: US 7,371,308 B1
(45) Date of Patent: May 13, 2008

(54) METHOD AND PLANT FOR PYROLIZING OF HYDROCARBON-CONTAINING WASTE PRODUCTS

(76) Inventor: Leopold Hackl, deceased, late of Amstetten (AT); by Eva Maria Hackl, legal representative, Amstetten, Friedlmühl 200a, A-3300 Amstetten (AT)

( * ) Notice: Subject to any disclaimer, the term of this patent is extended or adjusted under 35 U.S.C. 154(b) by 0 days.

(21) Appl. No.: 09/762,143

(22) PCT Filed: Aug. 2, 1999

(86) PCT No.: PCT/IB99/01516

§ 371 (c)(1),
(2), (4) Date: Jan. 31, 2001

(87) PCT Pub. No.: WO00/06667

PCT Pub. Date: Feb. 10, 2000

(30) Foreign Application Priority Data

Jul. 31, 1998 (DE) ................ 198 34 596

(51) Int. Cl.
*C10B 51/00* (2006.01)
(52) U.S. Cl. .............. 201/25; 202/87; 202/95; 202/115
(58) Field of Classification Search ............. 201/25, 201/13; 202/87, 95, 115
See application file for complete search history.

(56) References Cited

U.S. PATENT DOCUMENTS 1,586,306 A    5/1926    Gröndal et al.
4,401,513 A  * 8/1983    Brewer ............... 202/97
5,418,256 A    5/1995    Dhawan et al.
5,783,046 A  * 7/1998    Flanigan ............. 201/25

FOREIGN PATENT DOCUMENTS

| DE | 37 41 110 A1 | 6/1989 |
| DE | 43 03 842 A1 | 2/1994 |
| FR | 640.770       | 7/1928 |
| GB | 705964        | 11/1951 |

* cited by examiner

*Primary Examiner*—N. Bhat
(74) *Attorney, Agent, or Firm*—Laurence A. Greenberg; Werner H. Stemer; Ralph E. Locher

(57) ABSTRACT

The invention describes a process and a plant for pyrolyzing hydrocarbon-containing waste products, in particular used tires or biowaste, in which the material to be pyrolyzed is introduced into a pyrolysis furnace and is pyrolyzed at 500° C. The significant factor is that the material is introduced as far as possible without being broken down, into a receiving device outside the furnace (1), which receiving device is introduced into the pyrolysis furnace, which is open at the bottom, from below, the device simultaneously closing the furnace (1) in a sealed manner. The significant advantage is that a plurality of different receiving devices for different materials can be provided, so that the pyrolysis plant can be used with a relatively quick changeover for different pyrolysis raw materials, without changeover measures on the furnace being required.

18 Claims, 2 Drawing Sheets

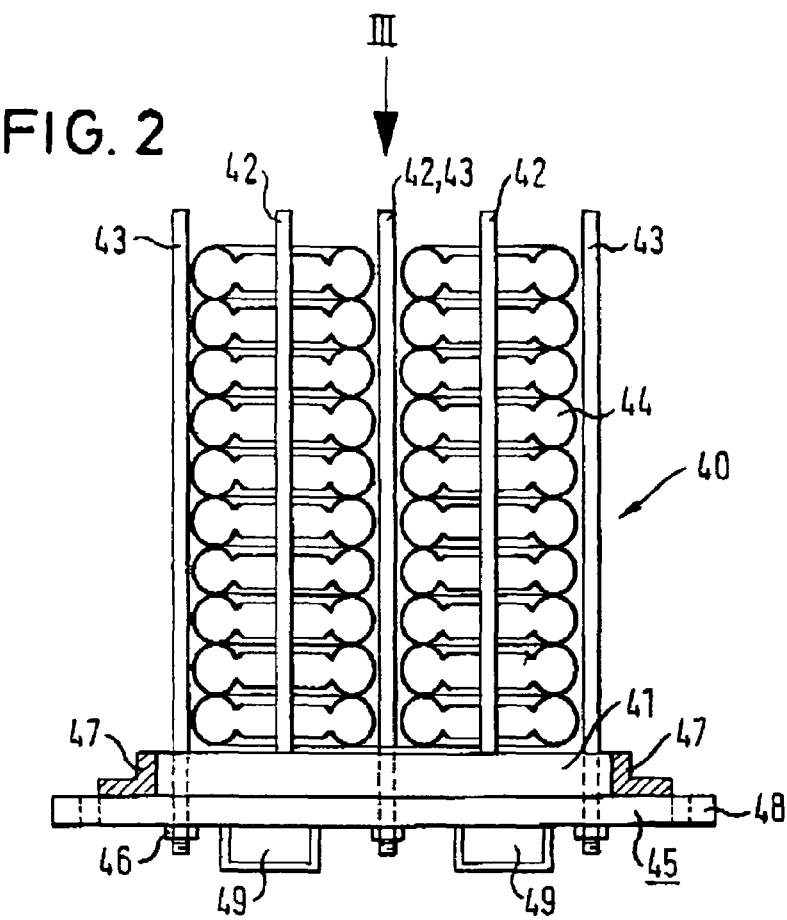
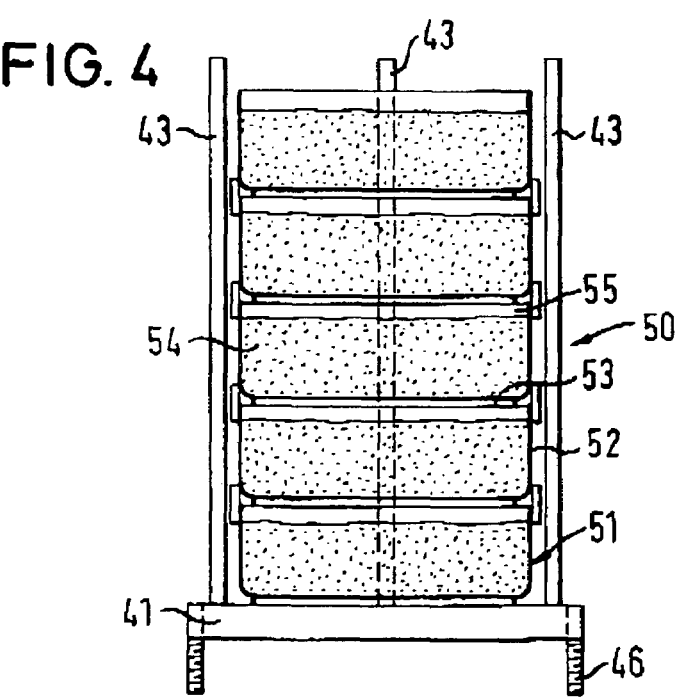

METHOD AND PLANT FOR PYROLIZING OF HYDROCARBON-CONTAINING WASTE PRODUCTS

The invention relates to a process and a plant for pyrolyzing hydrocarbon-containing material, in particular used tires, thus ensuring economical and environmentally friendly utilization of organic waste materials, such as used tires, plastics, paper, biomass, such as agricultural and forestry waste materials.

A multiplicity of processes and devices or plants are known with which it is possible to treat reuseable materials, in particular fuels, by pyrolysis from waste materials. All these processes and plants have the common drawback that they are of extremely complex structure and in terms of operation and, moreover, can only be used for the same type of material.

For example, DE 26 58 371 C2, DE 35 45 954 A1 and DE 35 23 653 C2 have disclosed fluidized-bed reactors in which material in large pieces, for example used tires which have not been comminuted or have only been roughly comminuted, are introduced into the furnace from above and are pyrolyzed, while the gaseous substances are extracted at the top and the solids are discharged at the bottom. The structure of these devices is relatively complex and, because of the use of a sand and cement clinker bed, with fluidizing gas which is correspondingly introduced in the radial direction, it is often difficult to maintain the appropriate flow conditions in the fluidized bed and, on account of the mass of material introduced, can easily be moved away from the equilibrium. For smaller, flexible embodiments which can easily be converted to different pyrolysis materials, these plants cannot be used.

Furthermore, what are known as continuous pyrolysis furnaces or fluidized-bed furnaces in which the material to be pyrolyzed is pyrolyzed either in complete pieces or in comminuted form are described, for example in DE 44 47 357 A1, DE 29 25 202 A1, DT 25 20 754 A1 and DE 26 39 165 A1. These continuous pyrolysis furnaces are likewise of extremely complex structure are in each case designed for a specific type and/or size of material and cannot readily be converted for different types of material.

Pyrolysis plants which are used to pyrolyze comminuted used tires or other organic waste materials are also known, for example, from DE 27 24 813 A1, EP 0 477 187 B1 and DE 30 30 593 C2. These plants are in some cases of complex design and moreover cannot be used as an alternative, without special conversion work, both for whole used tires and for lumpy or bulk material.

Finally, DE 31 38 128 C2 has disclosed a process for the thermal conversion of used tires into liquid and gaseous substances, in which a rolling truck which is laden with complete used tires is introduced horizontally into a furnace, where the tires are treated with oil which has been heated to approximately 390° using the trickling technique.

Therefore, it is an object of the invention to provide a process and a plant of the abovementioned generic type which are easy to carry out or are of simple structure and which allow any desired rapid change with respect to the material which is to be pyrolyzed, for example complete used tires or organic waste bulk material, without special conversion of the furnace.

Accordingly, the material to be pyrolyzed is introduced vertically, from below, into a substantially bell-shaped pyrolysis furnace, which can be opened at the bottom, with the aid of a corresponding receiving device and is pyrolyzed at approximately 500° C., the volatile constituents (low-temperature carbonization gas) if appropriate being cleaned in a known way and being passed into a condenser. Depending on the way in which the process is carried out, different gaseous and liquid constituents are obtained, for example oil, which can be used, inter alia, as fuel oil. This fuel oil can be used to operate the burner of the pyrolysis furnace according to the invention, so that no additional energy is required from the outside for operation of the plant, or at least of the pyrolysis furnace. The solid residues which remain after the pyrolysis, such as steel-wire scrap and pyrolyzed carbon, after the end of pyrolysis are discharged from the furnace again vertically downward in or using the receiving device and are moved into an unloading station, where they are removed from the receiving device.

Depending on what type of hydrocarbon-containing material is to be pyrolyzed, for example uncomminuted used tires of various sizes, comminuted pieces of plastic or biowaste material, such as wood, straw, green plants, weeds, etc., according to the invention the materials can in principle be introduced into different receiving devices.

For example, used tires are introduced into receiving devices which have one, three or more vertically pointing receiving rods attached to a base plate, on which rods the tires are stacked or arranged in rows vertically on top of one another. The receiving device to which car tires have been fitted in this way is attached to the top side of the furnace base which has been removed and is introduced vertically upward into the open furnace together with this base. The furnace base to which tires have been fitted in this way is then closed in a sealed manner by means of quick-acting closures, screw closures, or the like, in a manner which is known per se. However, the base plate of the receiving device may also, at the same time, be designed as the furnace base and can be directly introduced into the furnace without further interim assembly and attached to the furnace.

A particular advantage of the pyrolysis of used tires according to the invention is that after the pyrolysis has taken place and the receiving device has been transferred to a removal station, the residual materials can easily be separated from one another. For example, the receiving device is pivoted through at least 30° up to approximately 90° with respect to the vertical, with the result that the pyrolyzed carbon which is able to flow drops out of the receiving device, for example onto a conveyor belt, a process which can be accelerated or reinforced by at least gentle shaking. Steel-wire scrap remains in place, hanging as an annular mesh from the receiving rods in relatively clean form, and can be pulled off these rods and removed without problems. It can be pulled off by means of a dedicated combing device which, for example for each rod, presses the steel mesh situated thereon onto the base plate of the receiving device from above, possibly shaking it at the same time, after which this mesh, having been compressed in this way, is pulled off the rod, residual pieces of carbon crumbling away at the same time. In this way, clear, clean separation of the solid residues is achieved without major outlay.

In the case of pyrolysis of, for example, comminuted plastic or biomass material which is capable of forming a bulk bed, the receiving device comprises one or more receiving containers which can be stacked on top of one another and are filled to at most 90% of their height with material which is to be pyrolyzed. The at least 10% remaining clear height between the containers serves for the circulation of hot air, for which purpose in addition the side walls of the containers may additionally be provided with openings, forming perforated containers. It is expedient for at least the container bases to be left unperforated, in order to prevent the pyrolyzed carbon from trickling downward down to the base plate of the receiving device. Naturally, the container walls may consist of mesh material at least in their upper edge zones or other measures which are known per se may be taken in order to optimize circulation of hot gas. In any case, after pyrolysis is complete and after the container-receiving device has been removed from the furnace and introduced into the unloading station which, of course, may at the same time also be a loading station, the containers are to be appropriately removed from the receiving device and the solid pyrolysis residues are to be emptied out of the containers. The empty containers can then be stacked back into a receiving device. To avoid undesirable formation of carbon dust when shaking the pyrolysis soot out of the receiving devices or off the base plate or out of the containers, it is possible in a simple manner for the pyrolyzed carbon to be sucked directly out of the receiving devices, i.e. off the base plate of the device or out of the containers, and to be introduced into appropriate receiving or transport containers.

Furthermore, according to the invention it is advantageous if, when heating the pyrolysis furnace, for example by means of a gas or oil burner, the hot gases which are generated in the between the concentric furnace walls of the double-walled furnace via a helically arranged hot-air duct [sic], the hot air is passed helically from the bottom upward and is then extracted at the upper end of the furnace, and the heat from the outgoing air is economically utilized in a known way. For example, this hot off-gas may, inter alia, be fed back to the furnace, specifically the lower zone thereof, or hot air from a heat exchanger can be introduced. In this way, even when the burner is temporarily switched off, for example while the furnace is open during introduction or removal of the receiving device together with material to be pyrolyzed, the furnace can be held at the optimum temperature, so that the furnace can very quickly be brought back to an optimum pyrolysis temperature of 450°-550° C. According to the invention, this allows the process to take place in a very energy-saving and economic manner.

It is advantageous if the helical transverse walls of the helical duct are in each case only welded onto the furnace inner wall while being connected to the outer wall in a thermally insulated manner. This avoids the formation of a temperature bridge via which valuable heat is dissipated to the outside instead of to the inside. Moreover, in a manner known per se the furnace walls are surrounded on the outside by a thermally insulated jacket. Also, in the vicinity of the burner the furnace walls are provided with fire clay, in order to protect them against the effects of excessive heat.

To achieve a particularly high level of thermal efficiency, heat-emitting plates which extend radially inward into the furnace interior are provided, which plates, as annular ribs, line the entire interior of the furnace. Furthermore, to facilitate work and at the same time to reinforce the ribs, at least three or more vertical introduction rails, which are uniformly spaced apart from one another, are arranged on the inside of the ribs. These rails interact with introduction rods which are arranged on the receiving devices, likewise distributed uniformly over the circumference and in the same number.

According to the invention, the carbon obtained by the pyrolysis described above (pyrolyzed soot) can be utilized further in extremely valuable ways.

For example, the pyrolyzed carbon, in combination with small proportions of cement, can be used for construction materials which are highly thermally insulating, such as for example panels or tiles.

Pyrolyzed soot can also be used in combination with gypsum or refractory cement for fireproofing elements, for example for fireproof panels and fireguards or heat shields. For this purpose, by way of example three parts plastic or carbon are mixed with one part gypsum, naturally with the addition of water, and this mixture is processed to form a panel, for example. Tests have shown that a panel with a thickness of approximately 1.5 cm can be heated until it is glowing at the top and at the same time can be supported by hand from below without heat affecting the hand.

The use according to the invention as a fire-extinguishing means, for example for extinguishing burning oil, represents a particular use of the pyrolyzed carbon (soot). This is because if carbon dust is scattered on burning oil, firstly the supply of atmospheric oxygen to the layer of oil is suppressed and, in addition, the oil is sucked up by the carbon, which has a high suction capacity (adsorption), so that the fire is extinguished by the carbon, which itself no longer burns. In this way, a burning slick of oil or even burning oil in a pan in the kitchen can be extinguished very efficiently and relatively quickly.

Finally, according to the invention pyrolyzed carbon can be used to prevent or restrict the oil pollution which is known to have such a catastrophic effect after an oil tanker accident, for example. In this case, the ability of carbon to suck up large quantities of oil and at the same time not to be wetted by water is utilized, with the result that the carbon always floats on the surface of the water. For example, an oil slick which is spreading after a tanker accident is scattered with a suitable quantity of carbon, after which the carpet of carbon, which has sucked itself full of oil and is of considerably smaller area than the oil slick which was previously present, is scooped up. It can then be supplied for renewed pyrolysis, for example by the plant according to the invention, by which means oil and carbon are separated again.

According to the invention it is possible, as mentioned above, to produce high-quality plant oils, such as fir leaf oil or medical plant oils, which can be used in medicine and/or cosmetics.

It is also possible to pyrolyze animal corpses according to the invention, with the result that an oil and "animal charcoal" are likewise obtained. This eliminates the customary incineration of animal corpses.

The invention is explained in more detail below on the basis of an exemplary embodiment and with reference to the drawing, in which:

BRIEF DESCRIPTION OF THE DRAWINGS

FIG. 2 shows a side view of a receiving device for pyrolyzing used tires, in an embodiment which is fixedly connected to an exchangeable furnace bottom plate, FIG. 4 shows a side view of a receiving device with receiving containers for bulk material which is to be pyrolyzed, in a design for exchangeable attachment to a pyrolysis-furnace bottom plate.

Figure 1:
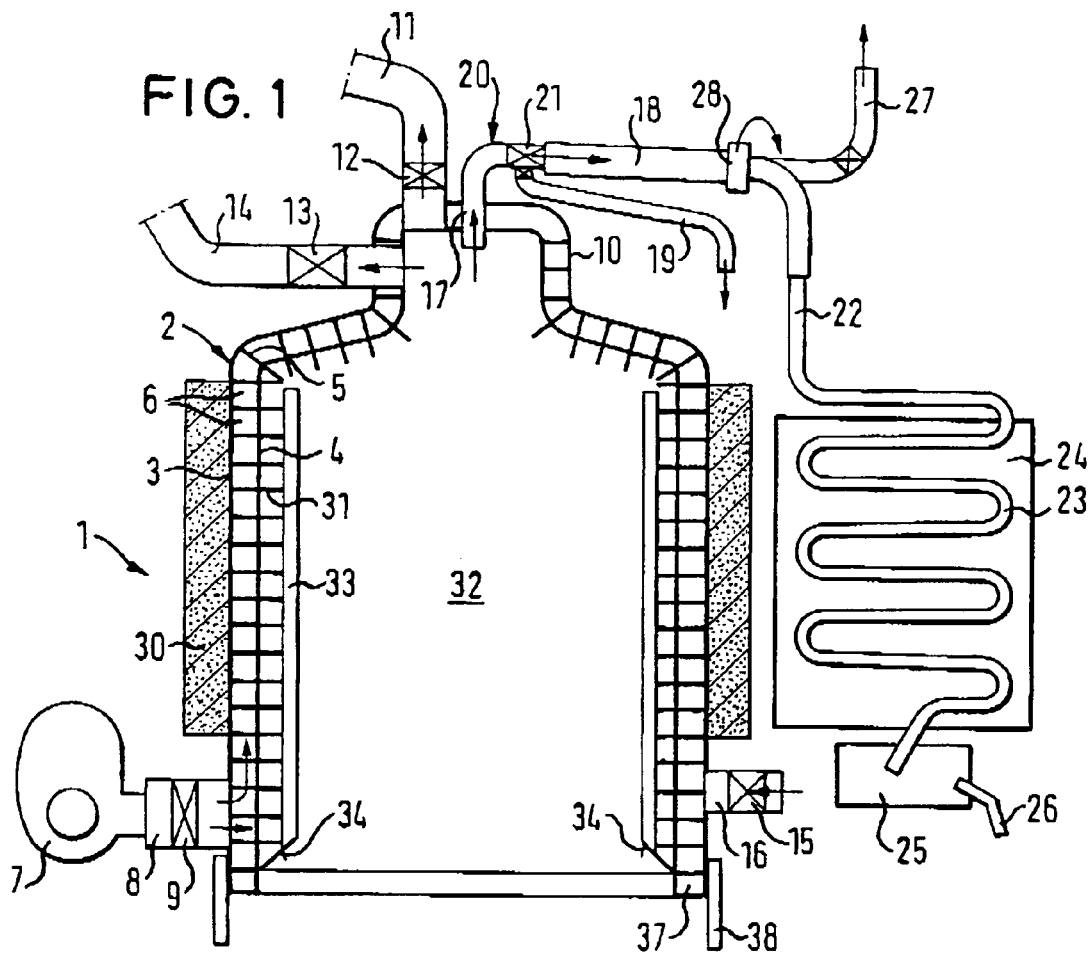
FIG. 1 shows a diagrammatic illustration, in vertical section, of a pyrolysis furnace according to the invention which is open at the bottom, without a bottom plate.
Figure 3:
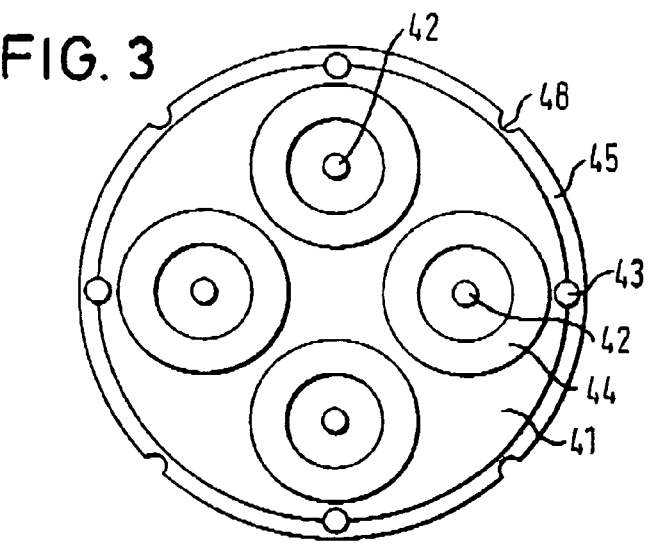
FIG. 3 shows a view in the direction of arrow III from FIG. 2, illustrating the arrangement of the used tires on the receiving device.

As can be seen from the drawing, the plant according to the invention for the pyrolysis of hydrocarbon-containing material comprises a pyrolysis furnace 1. Its double-walled, substantially bell-shaped furnace wall 2 comprises an outer wall 3 with an inner wall 4 at a constant distance therefrom, between which walls there is arranged a transverse radial wall 5 which leads helically from the bottom upward and forms a helical duct 6, for guiding the hot air which is generated by a burner 7 helically from the bottom upward in the double wall. A slide valve 9, which is used to control the introduction of the hot air into the helical duct 6, is provided in the burner opening 8. At its upper side, the furnace wall is tapered in terms of diameter to form a dome, a few outlet pipes being arranged so as to lead away from this dome.

For example, an off-gas pipe 11 is provided leading away upward, via which pipe the hot air emanating from the burner 7, which has been conveyed upward via the helical duct 6, is dissipated through a stack or is passed to a heat exchanger or other user of hot air.

If necessary, this off-gas pipe 11 can be closed off by means of a valve 12. A pipeline 14, which can be controlled by means of a valve 13, leads radially away from the interior of the dome 10 and serves to extract heat for a heat exchanger or for a heat accumulator, hot air emanating therefrom then being fed, for example via a supply pipe 16 provided with a valve 15 at the underside of the furnace, into the helical duct 6.

Moreover, a discharge pipe 20, by means of which the pyrolysis gases which collect in the dome are discharged, leads vertically out of the dome 10 substantially in the center. The discharge pipe comprises a short vertical pipe section 17, which merges into a pipe section 18 which is inclined downward slightly with respect to the horizontal and is of slightly larger cross section than the pipe section 17. A condensation-water line 19 leads away from the pipe section 18, a temperature-controlled electrovalve 21 being led either to the line 19 or to the pipe section 18 which carries gas and oil vapors. For its part, the pipe section 18 leads either via the oil line 22 into a cooling coil 23, which is passed through a cooling-water vessel 24 and opens into an oil collection vessel 25, from which the oil which has been collected can be discharged via an outlet pipe 26.

However, the pipe section 18 may also merge into a gas pipeline 27, which can be effected via a rotary switching part 28. Pyrolysis gas, which furthermore can also be passed as fuel gas to the burner 7, for example, is discharged into this gas pipeline 27, in particular when the pyrolysis process is managed for gas generation, e.g. for the generation of wood gas. It can be cooled in the same way or a similar way to the line 22, for example by means of cooling coil and cooling vessel. It should be noted that a substantially unpressurized, continuous gas circulation can take place, with no gas escaping to the outside.

With regard to the radial wall 5 which forms the helical duct 6, it should be noted that it is only attached to the furnace inner wall 4 by welding or the like, while with regard to the outer wall 3 it is simply sealed in a thermally insulated manner, in order to avoid unnecessary dissipation of heat to the outside. Moreover, on the outside the furnace is provided with an insulating jacket 30, while ribs 31 which face radially inward are provided on the inner wall 4 and are used to improve the transfer of heat into the furnace interior 32.

At least three vertical introduction rails 33, which form an introduction slope 34 at their lower side, are attached, in a uniform circumferential distribution, to the inner side of the ribs 31. At the bottom, the furnace is closed off by a flange part 37, on which attachment elements 38 in the form of screws or the like, for a furnace base which is still to be described in connection with the further figures, are present.

As can be seen from FIG. 2, according to the invention a first receiving device 40 substantially comprises a base plate 41, to which a plurality of receiving rods 42 for receiving used tires 44 stacked vertically on top of one another are attached. In this embodiment, four receiving rods are provided. The way in which they are arranged on the base plate 41 depends on the size of the used tires and of the pyrolysis furnace or the base plate 41 of the receiving device 40.

Furthermore, introduction rods 43 are provided on the outer circumference of the base plate 41, which introduction rods interact with the introduction rails 33 of the pyrolysis furnace 1 when the receiving device 40 is being introduced into the pyrolysis furnace and help to prevent damage to the receiving device and/or the furnace inner lining. The base plate 41 is attached to a bottom plate 45 by means of screw attachment elements 46, and this bottom plate 45 for its part has a sealing attachment flange 47. When the receiving device 40 has been introduced into and secured in the pyrolysis furnace 1, the attachment flange interacts with the flange part 37 of the pyrolysis furnace for providing a sealed attachment, after which, as a result of interaction of attachment eyelets 48 with the attachment elements 38 of the furnace, they secure the receiving device 40 above the bottom plate 45. On the underside of the bottom plate 45 there are stacking recesses 49, by means of which the receiving device 40 is handled. This means that the stacking recesses 49 are accessed by means of a fork-lift truck, the attachment elements 38, 48 are detached, the fork-lift truck which is carrying the receiving device 40 above its bottom plate 45 lowers it vertically until it has been moved all the way out of the furnace and then moves it into an unloading station, after which it brings a newly laden receiving device to the furnace and lifts or introduces it vertically into the furnace.

The receiving device 50 illustrated in FIG. 4 likewise has a base plate 41 on which screw attachment elements 46 serve for attachment to a bottom plate (not shown here) in a similar manner to that illustrated in FIG. 2. In this case too, introduction rods 43, which interact with the introduction rails 33 during introduction and removal, are provided on the base plate 41. Receiving containers 51 are stacked vertically on top of one another on the base plate 41, which containers are supported with respect to one another by means of stacking edges 53 which are provided in each case. Naturally, it is also possible to use a design in which an additional support for the receiving containers 51 is provided via the introduction rods 43. Bulk material 54 has been introduced into the receiving containers 51, specifically only sufficiently far for there to remain a distance 55 with respect to the upper edge of the container or the receiving container 51 stacked above it, this distance being used for rapid, unimpeded heat exchange. In addition, perforations are provided in the vertical walls 52 of the receiving containers 51, provided that there is not a bulk material which could trickle laterally out of these holes in the wall.

LIST OF REFERENCE SYMBOLS

| | |
|---|---|
| 1 | Pyrolysis furnace |
| 2 | Furnace wall |
| 3 | Outer wall |
| 4 | Inner wall |

-continued

LIST OF REFERENCE SYMBOLS

| | |
|---|---|
| 5 | Radial wall |
| 6 | Helical duct |
| 7 | Burner |
| 8 | Burner duct |
| 9 | Valve |
| 10 | Dome |
| 11 | Off-gas pipe |
| 12 | Valve |
| 13 | Valve pipe |
| 14 | Pipeline |
| 15 | Valve |
| 16 | Supply pipe |
| 17 | Pipe section |
| 18 | Pipe section |
| 19 | Condensation-water line |
| 20 | Discharge pipe |
| 21 | Electrovalve |
| 22 | Oil line |
| 23 | Cooling coil |
| 24 | Cooling-water vessel |
| 25 | Oil collection vessel |
| 26 | Outlet pipe |
| 27 | Gas pipeline |
| 28 | Switching part |
| 29 | |
| 30 | Insulating jacket |
| 31 | Ribs |
| 32 | Furnace interior |
| 33 | Introduction rails |
| 34 | Introduction slope |
| 35 | |
| 36 | |
| 37 | Flange part |
| 38 | Attachment element |
| 39 | |
| 40 | Receiving device |
| 41 | Base plate |
| 42 | Receiving rod |
| 43 | Introduction rod |
| 44 | Used tires |
| 45 | Bottom plate |
| 46 | Attachment element |
| 47 | Attachment flange |
| 48 | Attachment eyelet |
| 49 | Stacking recess |
| 50 | Receiving device |
| 51 | Receiving container |
| 52 | Wall |
| 53 | stacking edges |
| 54 | Bulk material |
| 55 | Distance |

What is claimed is:

1. A process for pyrolyzing hydrocarbon-containing waste products which comprises:
providing only one pyrolysis furnace having an openable bottom, an upper end forming a dome, and a double-wall with a helically arranged hot-air helical duct; a discharge pipe leading vertically out the furnace dome; a loading station outside the furnace; a receiving device initially located at the loading station; and an unloading station;
introducing a material to be pyrolyzed onto the receiving device;
subsequently introducing the receiving device from below into the pyrolysis furnace through the open bottom and thereby tightly closing the bottom of the pyrolysis furnace;
heating the furnace to a pyrolysis temperature of approximately between 450° C. and 550° C. with burners generating hot air passing helically from the bottom upward in the pyrolysis furnace through the helically arranged hot-air helical duct;
pyrolyzing completely the material thereby producing in-part pyrolysis gases and residues;
extracting the hot air at the upper end of the furnace;
discharging the pyrolysis gases via the discharge pipe;
after pyrolysis has concluded completely, opening the bottom and removing downward the receiving device;
moving the receiving device into the unloading station; and
discharging the residues at the unloading station.

2. The method according to claim 1, which further comprises:
moving another receiving device laden with material to be pyrolyzed from the loading station to the furnace; and
inserting the other receiving device into the latter.

3. The process according to claim 1, which comprises warming the furnace on an interim basis while the furnace is being loaded and unloaded from below with the outgoing hot air from the furnace.

4. The process according to claim 1, which further comprises using a heat-exchanger to extract heat from the hot air.

5. The process according to claim 1, wherein the material is used tires.

6. The process according to claim 5, which further comprises:
providing a vertical, upwardly facing receiving rod on the receiving device; and
stacking used tires on the receiving rod.

7. The process according to claim 1, wherein the material is bulk material.

8. The process according to claim 7, wherein the bulk material is agricultural and forestry products.

9. The process according to claim 7, which further comprises:
providing a receiving container;
filling the receiving container with the bulk material; and
placing the receiving container on the receiving device.

10. The process according to claim 9, which further comprises stacking a plurality of the receiving containers vertically on top of one another.

11. The process according to claim 6, which further comprises:
tilting the receiving device 30° to 90° with respect to the vertical in the unloading station;
shaking the materials to remove solid pyrolysis residues that are capable of flowing;
retaining metal constituents on the receiving rods; and
pulling the metal constituents off the receiving rods.

12. The process according to claim 9, which further comprises:
in the unloading station, removing the receiving containers from the receiving device in a vertical direction;
tilting and shaking solid pyrolysis residues in the receiving containers to discharge the solid pyrolysis residues;
reloading the solid pyrolysis residues in the receiving containers; and
reinserting the receiving containers into a receiving device.

13. The process according to claim 9, which further comprises:
in the unloading station, removing the receiving containers from the receiving device in a vertical direction;
sucking solid pyrolysis residues in the receiving containers to discharge the solid pyrolysis residues;
reloading the solid pyrolysis residues in the receiving containers; and reinserting the receiving containers into a receiving device.

14. An apparatus for pyrolyzing hydrocarbon containing waste products, comprising:

only one pyrolysis furnace having a bottom; an upper end with an extractor; a furnace dome disposed at said upper end; a double wall heated from the outside by a heater producing hot air, an inner wall of said double wall being a cylindrical furnace inner wall equipped with heat-emitting plates facing radially inward; helical transverse walls leading from said bottom upward and forming a helical duct for the hot air, the hot air passing helically from the bottom upward and being extracted at said upper end by said extractor; a discharge pipe for discharging pyrolysis gases leading vertically out of said furnace dome; a vertically lowerable base for lowering and raising to load and unload said furnace vertically, from therebelow.

15. The apparatus according to claim 14, wherein said heater is electric heater, an oil powered heater, a gas powered heater, or a combination thereof.

16. The apparatus according to claim 14, including:
   an upper hot-air pipe connected to said exchanger; and
   a supply pipe connected to said upper hot-air pipe and said furnace.

17. The apparatus according to claim 14, wherein the helical transverse walls of the helical duct are only welded onto the furnace inner wall and are connected to a furnace outer wall of said double wall and thermally insulated, said inner wall and said outer wall include fire clay near said heater, and a thermally insulating jacket covers said furnace.

18. The apparatus according to claim 14, wherein said heat-emitting plates are radiation ribs.

* * * * *